United States Patent
Ye et al.

(10) Patent No.: US 9,779,606 B2
(45) Date of Patent: Oct. 3, 2017

(54) METHODS, DEVICES, AND SYSTEMS FOR PROMPTING WHETHER PORTABLE LOCATOR HAS ARRIVED ON TIME

(71) Applicant: BEIJING QIHOO TECHNOLOGY COMPANY LIMITED, Beijing (CN)

(72) Inventors: Yanfang Ye, Beijing (CN); Chao Gao, Beijing (CN); Nancheng Liu, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 15/031,406

(22) PCT Filed: Oct. 24, 2014

(86) PCT No.: PCT/CN2014/089486
§ 371 (c)(1),
(2) Date: Apr. 22, 2016

(87) PCT Pub. No.: WO2015/058721
PCT Pub. Date: Apr. 30, 2015

(65) Prior Publication Data
US 2016/0267762 A1    Sep. 15, 2016

(30) Foreign Application Priority Data

Oct. 25, 2013  (CN) .......................... 2013 1 0513005
Oct. 25, 2013  (CN) .......................... 2013 1 0513030
Oct. 25, 2013  (CN) .......................... 2013 1 0514040

(51) Int. Cl.
*G08B 21/02* (2006.01)
*H04W 4/02* (2009.01)
(Continued)

(52) U.S. Cl.
CPC ......... *G08B 21/0283* (2013.01); *G01C 21/20* (2013.01); *G08B 21/025* (2013.01);
(Continued)

(58) Field of Classification Search
CPC combination set(s) only.
See application file for complete search history.

(56) References Cited

U.S. PATENT DOCUMENTS 6,169,903 B1 * 1/2001 Dorenbosch .......... H04W 64/00
                                                    455/456.5
6,289,279 B1 * 9/2001 Ito ........................ G01C 21/206
                                                    342/357.34
(Continued)

FOREIGN PATENT DOCUMENTS

CN   101627610 A   1/2010
CN   102123343 A   7/2011
(Continued)

OTHER PUBLICATIONS

International Search Report of the International Searching Authority for Application No. PCT/CN2014/089486, dated Jan. 28, 2015.

*Primary Examiner* — Kabir A Timory
(74) *Attorney, Agent, or Firm* — Alston & Bird LLP

(57) ABSTRACT

The present invention discloses a method, device, and system for prompting whether a portable locator has arrived on time, one of which comprising: a server, according to position point information transmitted by the portable locator, judges that there is not a position point indicative of arrival at a destination reminder area in a current preset time period and the current time has already exceeded an estimated arrival time, and then generates and issues a non-arrival reminder. By employing the present invention, the guardian confirms at any time that the monitored person carrying the portable locator does not arrive at the destination reminder area within the preset arrival time, and thereby (Continued)

masters the safety information of the monitored person, whereby the user experience is improved and subsequent person search effectiveness is enhanced.

20 Claims, 7 Drawing Sheets

(51) Int. Cl.
  *G01C 21/20* (2006.01)
  *H04W 12/06* (2009.01)
  *H04W 12/08* (2009.01)

(52) U.S. Cl.
  CPC ..... *G08B 21/0269* (2013.01); *G08B 21/0272* (2013.01); *G08B 21/0277* (2013.01); *G08B 21/0288* (2013.01); *H04W 4/028* (2013.01); *H04W 12/06* (2013.01); *H04W 12/08* (2013.01)

(56) References Cited

U.S. PATENT DOCUMENTS

| | | | | |
|---|---|---|---|---|
| 6,407,698 | B1 * | 6/2002 | Ayed | ............... G01S 1/047 342/357.31 |
| 2011/0238517 | A1 | 9/2011 | Ramalingam et al. | |

FOREIGN PATENT DOCUMENTS

| | | |
|---|---|---|
| CN | 102223601 A | 10/2011 |
| CN | 102393924 A | 3/2012 |
| CN | 102735252 A | 10/2012 |
| CN | 102798389 A | 11/2012 |
| CN | 102883270 A | 1/2013 |
| CN | 103557870 A | 2/2014 |
| CN | 103561070 A | 2/2014 |
| CN | 103561071 A | 2/2014 |
| CN | 103561074 A | 2/2014 |
| WO | WO 2010/117849 A2 | 10/2010 |

* cited by examiner

METHODS, DEVICES, AND SYSTEMS FOR PROMPTING WHETHER PORTABLE LOCATOR HAS ARRIVED ON TIME

CLAIM FOR FOREIGN PRIORITY

The application claims foreign priority to 201310513005.X filed on Oct. 25, 2013 in China, 201310513030.8 filed on Oct. 25, 2013 in China, and 201310514040.3 filed on Oct. 25, 2013 in China.

FIELD OF THE INVENTION

The present invention relates to the technical field of electronic communications, and particularly to methods, devices, and systems for prompting whether a portable locator has arrived on time.

BACKGROUND OF THE INVENTION

Children missing events have been drawing social concerns. When a child and his guardian wander away from each other, in the prior art, for example the child may send a short message to or initiate a voice call with the guardian by dialing the guardian's phone to advise the guardian of his current position information. However, it is very difficult to clearly describe the current position information as not being familiar with the ambient surrounding; furthermore, assume the child is confronted with a wicked abductor due to insufficient security awareness, he hardly finds his guardian. The guardian can only resort to news media or government authority to search the child, but the person search effectiveness is undesirable.

Hence, it is urgently desirable to provide a method of ensuring the guardian aware of the child's safety information at any time.

SUMMARY OF THE INVENTION

In view of the above problem, the present invention provides a method, device, and system for prompting whether a portable locator has arrived on time, which can overcome or at least partially solve ore ease the above problem.

According to an aspect of the present invention, there is provided a method, device and system for prompting whether a portable locator has arrived on time, to ensure that a guardian knows whether a child is safe at any time and improve person search effectiveness.

An embodiment of the present invention provides a method for prompting whether a portable locator has arrived on time, comprising:

the portable locator obtaining position point information of a position point where the portable locator is, and transmitting the position point information to a server;

the server recording the position point information and the positioning time corresponding to the position point information transmitted by the portable locator;

generating a location area according to the position point corresponding to the position point information, judging whether the number of position points corresponding to other position information occurring again in the location area in a preset time period exceeds a threshold, and marking the location area as a stay area corresponding to the preset time period if the number exceeds the threshold;

judging, for multiple different preset time periods, whether the number of stay areas corresponding to respective preset time periods which are identical or partially overlapped exceeds a threshold, judging whether time of first reaching the identical or partially overlapped stay areas in the respective preset time periods complies with a rule if the number exceeds the threshold, and setting the stay area as a destination reminder area if the time complies with the rule;

calculating an estimated arrival time of arrival at the destination reminder area according to the rule, or enabling the user to set an estimated arrival time of arrival at the destination reminder area;

judging whether there is a position point indicative of arrival at the destination reminder area in a current preset time period, and generating and issuing a non-arrival reminder if there is not such position point and the current time has already exceeded the estimated arrival time.

An embodiment of the present invention further provides a device for prompting whether a portable locator has arrived on time, arranged on a server side, comprising:

a receiving module configured to receive and record position point information and a positioning time corresponding to the position point information transmitted by the portable locator;

a judging module configured to generate a location area according to the position point corresponding to the position point information, and judge whether the number of position points corresponding to other position information occurring again in the location area in a preset time period exceeds a threshold;

a marking module configured to mark the location area as a stay area corresponding to the preset time period when the judging module judges the number of position points corresponding to other position information occurring again in the location area in the preset time period exceeds the threshold;

the marking module further configured to mark the stay area as a destination reminder area when the judging module judges, for multiple different preset time periods, the number of stay areas corresponding to respective preset time periods which are identical or partially overlapped exceeds a threshold, and judges that time of first reaching the identical or partially overlapped stay areas in the respective preset time periods complies with a rule;

an estimating module configured to calculate an estimated arrival time of arrival at the destination reminder area according to the rule, or enable the user to set an estimated arrival time of arrival at the destination reminder area;

a reminding module configured to generate and issue a non-arrival reminder when the judging module judges that is not a position point indicative of arrival at the destination reminder area in the current preset time period, and the current time has already exceeded the estimated arrival time.

An embodiment of the present invention further provides a system for prompting whether a portable locator has arrived on time, comprising a server, a portable locator and a monitoring terminal;

the server comprises the device for prompting whether a portable locator has arrived on time as stated above;

The monitoring terminal is configured to send an activation request to the server, the activation request comprising an identifier of the portable locator, so that the server activates the portable locator corresponding to the identifier;

The portable locator is configured to transmit position point information of the portable locator to the server after the server activates the portable locator.

In the embodiment of the present invention, the server, according to the position point information transmitted by the portable locator, judges that there is not a position point indicative of arrival at the destination reminder area in the current preset time period, and that the current time has already exceeded the estimated arrival time, and then generates and issues a non-arrival reminder. In this way, the guardian knows that the monitored person carrying the portable locator does not arrive at the destination reminder area within the preset arrival time, and thereby masters the safety information of the monitored person, whereby the user experience is improved and subsequent person search effectiveness is enhanced.

According to another aspect of the present invention, there is provided a method, device and system for prompting whether a portable locator has arrived on time, to ensure that a guardian knows whether a child is safe at any time and improve person search effectiveness.

An embodiment of the present invention provides a method for prompting whether a portable locator has arrived on time, comprising:

the portable locator obtaining position point information of a position point where the portable locator is, and transmitting the position point information to a server;

the server recording the position point information and the positioning time corresponding to the position point information transmitted by the portable locator;

generating a location area according to the position point corresponding to the position point information, judging whether the number of position points corresponding to other position information occurring again in the location area in a preset time period exceeds a threshold, and marking the location area as a stay area corresponding to the preset time period if the number exceeds the threshold;

judging, for multiple different preset time periods, whether the number of stay areas corresponding to respective preset time periods which are identical or partially overlapped exceeds a threshold, judging whether time of first reaching the identical or partially overlapped stay areas in the respective preset time periods complies with a rule if the number exceeds the threshold, and setting the stay area as a destination reminder area if the time complies with the rule;

displaying the destination reminder area in an electronic map to enable the user to set an estimated arrival time of arriving at the destination reminder area;

judging whether there is a position point indicative of arrival at the destination reminder area in the current preset time period, and generating and issuing a non-arrival reminder if there is not such position point and the current time has already exceeded the estimated arrival time.

An embodiment of the present invention further provides a device for prompting whether a portable locator has arrived on time, arranged on a server side, comprising:

a receiving module configured to receive and record position point information and a positioning time corresponding to the position point information transmitted by the portable locator;

a judging module configured to generate a location area according to the position point corresponding to the position point information, and judge whether the number of position points corresponding to other position information occurring again in the location area in a preset time period exceeds a threshold;

a marking module configured to mark the location area as a stay area corresponding to the preset time period when the judging module judges the number of position points corresponding to other position information occurring again in the location area in the preset time period exceeds the threshold;

the marking module further configured to mark the stay area as a destination reminder area when the judging module judges, for multiple different preset time periods, the number of stay areas corresponding to respective preset time periods which are identical or partially overlapped exceeds a threshold, and judges that time of first reaching the identical or partially overlapped stay areas in the respective preset time periods complies with the rule;

a displaying module configured to display the destination reminder area set by the marking module in an electronic map to enable the user to set an estimated arrival time of arriving at the destination reminder area;

a reminding module configured to generate and issue a non-arrival reminder when the judging module judges that is not a position point indicative of arrival at the destination reminder area in the current preset time period, and the current time has already exceeded the estimated arrival time.

An embodiment of the present invention further provides a system for prompting whether a portable locator has arrived on time, comprising a server, a portable locator and a monitoring terminal;

the server comprises the device for prompting whether a portable locator has arrived on time as stated in the above second aspect;

The monitoring terminal is configured to send an activation request to the server, the activation request comprising an identifier of the portable locator, so that the server activates the portable locator corresponding to the identifier;

The portable locator is configured to transmit position point information of the portable locator to the server after the server activates the portable locator.

In the embodiment of the present invention, the server, according to the position point information transmitted by the portable locator, judges whether there is a position point indicative of arrival at the destination reminder area in the current preset time period, and generates a non-arrival reminder if there is not such position point and the current time has already exceeded the set arrival time, to advise the monitoring terminal that the portable locator does not arrive at the stay area within the set arrival time. In this way, it is ensured that the guardian holding the monitoring terminal knows at any time whether the monitored person carrying the portable locator has arrived at the destination on time, and thereby masters the safety information of the monitored person, whereby the user experience is improved and subsequent person search effectiveness is enhanced.

According to a further aspect of the present invention, there is provided a method, device and system for prompting whether a portable locator has arrived on time, to ensure that a guardian knows whether a child is safe at any time and improve person search effectiveness.

An embodiment of the present invention provides a method for prompting whether a portable locator has arrived on time, comprising:

the portable locator obtaining position point information of a position point where the portable locator is, and transmitting the position point information to a server;

the server recording the position point information and the positioning time corresponding to the position point information transmitted by the portable locator, and calculating and recording a route according to the positioning time and the position point information;

generating a location area according to the position point corresponding to the position point information, judging whether the number of position points corresponding to other position information occurring again in the location area in a preset time period exceeds a threshold, and marking the location area as a stay area if the number exceeds the threshold;

according to the already-recorded route, determining times of travel from a stay area to another stay area, judging whether the times of travel from a stay area to another stay area exceeds a threshold, calculating a predicted travel time between the two stay areas or enabling the user to set the predicted travel time between the two stay areas, if the times exceed the threshold;

according to the already-recorded route and a trajectory rule and/or time rule, upon judging that the current position point of the portable locator already has left a stay area and judging a target area of the portable locator is another stay area, obtaining a positioning time corresponding to the position point of the portable locator appearing for the last time in the said stay area and a positioning time corresponding to the current position point of the portable locator, and calculating a time length between the two positioning times;

judging whether the time length exceeds the predicted travel time between the two stay areas, and generating and issuing a reminder indicative of failure to arrive at said another stay area within the predicted travel time if the time length exceeds the predicted travel time.

An embodiment of the present invention further provides a device for prompting whether a portable locator has arrived on time, arranged on a server side, comprising:

a receiving module configured to receive position point information and a positioning time corresponding to the position point information transmitted by the portable locator;

a recording module configured to calculate and record a route according to the position point information and a positioning time corresponding to the position point information transmitted by the portable locator and received by the receiving module;

a judging module configured to generate a location area according to the position point corresponding to the position point information, and judge whether the number of position points corresponding to other position information occurring again in the location area in a preset time period exceeds a threshold;

a marking module configured to mark the location area as a stay area when the judging module judges the number of position points corresponding to other position information occurring again in the location area in a preset time period exceeds the threshold;

a predicting module configured to, when the judging module, according to the already-recorded route, determines times of travel from a stay area to another stay area, and judges that the times of travel from a stay area to another stay area exceeds a threshold, calculate a predicted travel time between the two stay areas;

a calculating module configured to, when the judging module, according to the already-recorded route and a trajectory rule and/or time rule, judges that the current position point of the portable locator already has left a stay area and judges a target area of the portable locator is another stay area, obtain a positioning time corresponding to the position point of the portable locator appearing for the last time in the said stay area and a positioning time corresponding to the current position point of the portable locator, and calculate a time length between the two positioning times;

a reminding module configured to generate and issue a reminder indicative of failure to arrive at said another stay area within a predicted travel time when the judging module judges the time length exceeds the predicted travel time between the two stay areas.

An embodiment of the present invention further provides a system for prompting whether a portable locator has arrived on time, comprising a server, a portable locator and a monitoring terminal;

the server comprises the device for prompting whether a portable locator has arrived on time according to the above second aspect;

The monitoring terminal is configured to send an activation request to the server, the activation request comprising an identifier of the portable locator, so that the server activates the portable locator corresponding to the identifier;

The portable locator is configured to transmit position point information of the portable locator to the server after the server activates the portable locator.

In the embodiment of the present invention, the server, according to the already-recorded route, determines the travel trajectory from one stay area to another stay area, judges that the current position point of the portable locator already has left the stay area and is on the travel trajectory between the two stay areas, and then calculates a time length between a positioning time when the portable locator leaves the last position point of the stay area and a positioning time corresponding to the current position point of the portable locator; judges whether the time length exceeds the predicted travel time between the two stay areas, and generates and issues a reminder indicative of failure to arrive at said another stay area within the predicted travel time if the time length exceeds the predicted travel time. In this way, it is ensured that the guardian holding the monitoring terminal knows at any time whether the monitored person carrying the portable locator has arrived at the destination on time, and thereby masters the safety information of the monitored person, whereby the user experience is improved.

According to another aspect of the present invention, there is provided a computer program which comprises a computer readable code; when the computer readable code is run on a server, the computing device executes a method for prompting whether a portable locator has arrived on time as disclosed herein.

According to a further aspect of the present invention, there is provided a computer readable medium which stores the computer program disclosed herein.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

The present invention will be further described in conjunction with the figures and specific embodiments.

Embodiment 1

Noticeably, a monitoring terminal mentioned in embodiments of the present invention for example includes a mobile monitoring terminal (mobile phone) held by a guardian.

A portable locator includes a bracelet-like portable locator worn on a wrist of a person under guardianship. The portable locator for example has a positioning function of a Global Positioning System GPS; again for example further has a communication function of a General Packet Radio Service GPRS technology; again for example further a communication function of Global System of Mobile GSM communication; again for example has a communication function of Bluetooth and/or Bluetooth Low Energy BLE; again for example further has a communication function of Enhanced Data Rate for GSM Evolution EDGE; again for example further has a communication function of Code Division Multiple Access CDMA; again for example further has a communication function of Wide band Code Division Multiple Access WCDMA; again for example further has a communication function of Time Division-Synchronous Code Division Multiple Access TD-SCDMA; again for example further has a communication function of Time Division Long Term Evolution TD-LTE; and again for example further has a communication function of Long Term Evolution LTE;

A server for example includes a server arranged in equipment such as a base station or a macro eNodeB.

Figure 1:
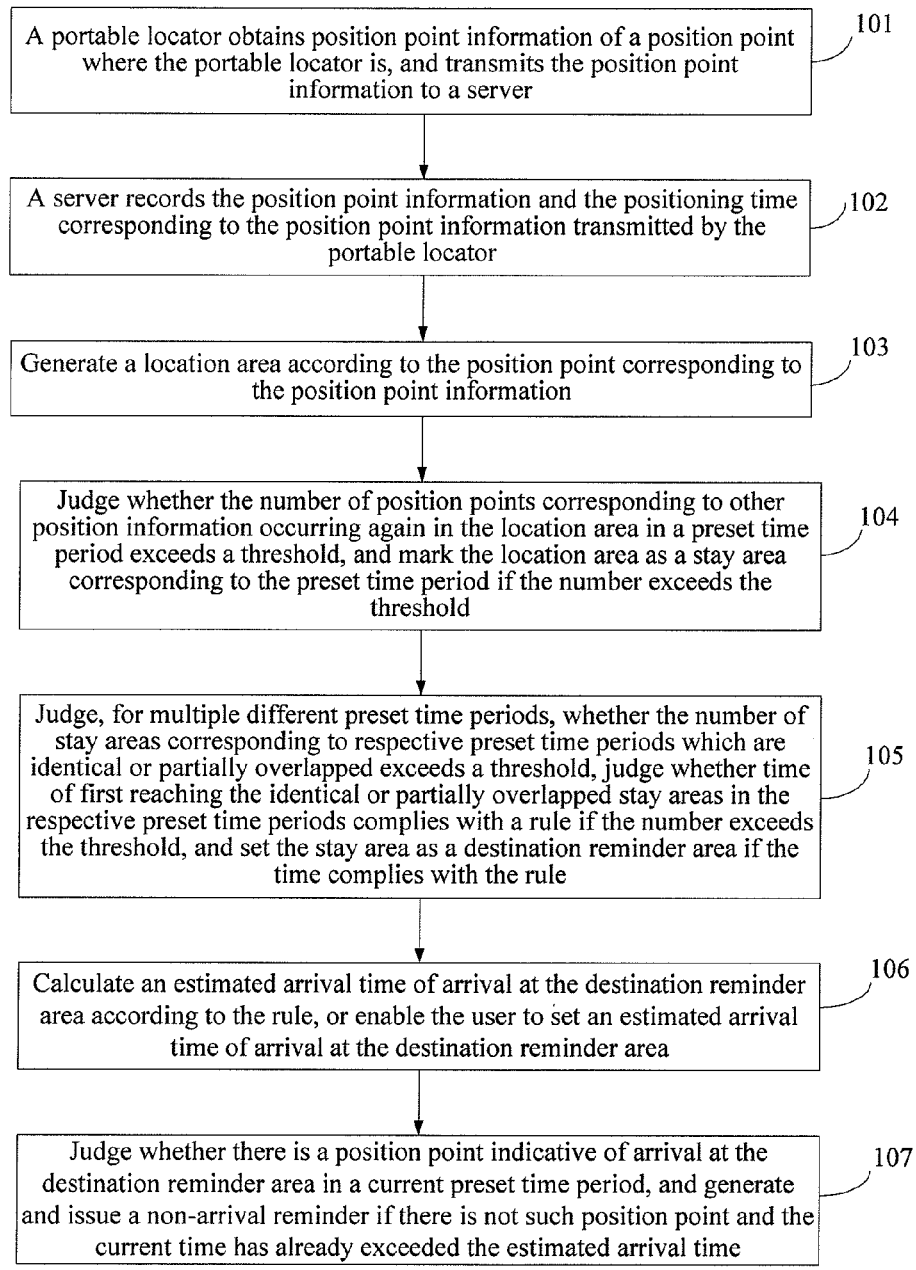
FIG. 1 is a flow chart of a method for prompting whether a portable locator has arrived on time according to an embodiment of the present invention.

FIG. 1 is a flow chart of a method for prompting whether a portable locator has arrived on time according to an embodiment of the present invention. As shown in FIG. 1, the method comprises step 101 to step 107:

101: The portable locator obtains position point information of a position point where it lies, and transmits the position point information to a server;

In an optional embodiment of the present invention, the method comprises prior to step 101:

The monitoring terminal sends an activation request to the server, wherein the activation request comprises an identifier of the portable locator; wherein the identifier of the portable locator for example comprises a QR code of the portable locator or a Subscriber Identity Module SIM card number set in the portable locator;

The server performs authorization verification for the monitoring terminal according to the identifier of the portable locator so that the monitoring terminal has a monitoring right to the portable locator, and activates the portable locator corresponding to the identifier so that the activated portable locator may transmit the position point information of the portable locator to the server.

Furthermore, the monitoring terminal may transmit to the activated portable locator via the server a time interval of reporting the position point information or a reporting time so that the portable locator regularly transmits the position point information of the portable locator to the server according to the above time interval or reporting time; or The server transmits to the portable locator a time interval of reporting the position point information or a reporting time so that the portable locator regularly transmits the position point information of the portable locator to the server according to the above time interval or reporting time; or The portable locator presets a time interval of reporting the position point information or the reporting time, and regularly transmits the position point information of the portable locator to the server according to the above time interval or reporting time.

102: The server records the position point information and the positioning time corresponding to the position point information transmitted by the portable locator;

103: generating a location area according to the position point corresponding to the position point information:

In an optional embodiment of the present invention, step 103, upon specific implementation, comprises:

a first type: according to the position point information, considering a natural geographical area where the position point corresponding to the position point information as the location area corresponding to the position point information; for example, assume when the natural geographical area is a school, a boundary of the school is a boundary of the natural geographical area so long as the position point occurring in the school belongs to the school as the natural geographical area; or a second type: with the position point corresponding to the position point information as a center, considering a surrounding area of a preset radius as the location area corresponding to the position point information; for example, with the position point reported by the locator as a center, considering an area within a surrounding scope of a preset radius (e.g., a radius of 20 meters) as the location area corresponding to the position point; or a third type: judging there are multiple position points neighboring the position point corresponding to the position point information, and determining the location area corresponding to the position point information according to a distance between the position point and the multiple neighboring position points; for example, if there are multiple position points neighboring the position point according to the position points reported by the locator, assume a preset distance of neighborhood is 10 meters, an area constituted by the neighboring position points within 10 meters (inclusive) relative to the position point may be considered as the location area corresponding to the position point.

104: judging whether the number of position points corresponding to other position information occurring again in the location area in a preset time period exceeds a threshold, and marking the location area as a stay area if the number exceeds the threshold;

In an optional embodiment of the present invention, step 104, upon specific implementation, comprises:

making statistics for the number of position points corresponding to the position point information in the location area among already-recorded position point information in the same preset time period as a preset time period where a positioning time of the position point information lies; for example, making statistics of multiple position point information already recorded by the server and reported by the locator within a preset time period (one day ore several hours), respectively determining position points corresponding to the multiple position point information, determining which position points fall within the location area determined in step 103 according to respective position points, and making statistics of the number of position points falling within the location area determined in step 103; for example, presetting two hours to make statistics of the number of position points in a certain location area once, specifically, calculation may be performed as to whether the number of position points appearing in the location area within two hours counted from the positioning time of the first position point information exceeds a threshold, and the position points appearing in the location area after two hours can only participate in next statistics of the number of position points in the location area.

In the present embodiment, the preset threshold may be specifically set according to different location areas. For example, when the monitored person is a child, school and home, the two location areas, are safe location areas, stay in the two location areas is relatively longer, there are relatively more position point information recorded in the two location areas, so the threshold for the number of position points in the two location areas is relatively larger.

In an optional embodiment of the present invention, step 104, upon specific implementation, comprises:

obtaining, in a preset time period, a positioning time corresponding to the position point appearing for the first time in the location area and a positioning time corresponding to the position point appearing for the last time in the location area, and calculating a time length between the two positioning times;

judging whether the time length reaches a time threshold, marking the location area as a stay area corresponding to the preset time period if the time length reaches the time threshold; or, calculating a proportion of the number of position points appearing in the location area in the time length to the number of position points corresponding to all position point information recorded in the time length, and marking the location area as the stay area corresponding to the preset time period if the proportion is higher than a preset value.

Noticeably, in the present embodiment, the preset time period may be one day or a certain fixed time period of each day, or even each interval of a fixed time period, for example, every 12 hours may be regarded as the preset time period.

It needs to be appreciated that a rule in the present embodiment is illustrated by way of an example; if the school becomes the stay area, it may be automatically learnt according to the position point information reported by the portable locator that the rule of going to school at the school as the location area from Monday through Friday, and it is automatically learnt that the school is set as the stay area according to the rule of going to school at the school as the location area from Monday through Friday.

105: judging, for multiple different preset time periods, whether the number of stay areas corresponding to respective preset time periods which are identical or partially overlapped exceeds a threshold, judging whether time of reaching the identical or partially overlapping stay areas for the first time in the respective preset time periods complies with the rule if the number exceeds the threshold, and setting the stay area as a destination reminder area if the time complies with the rule.

It is appreciated that the time of arrival at the identical or partially overlapped stay areas for the first time in respective preset time periods refers to a positioning time corresponding to the position point at which the portable locator appears for the first time at the identical or overlapped stay areas in the respective preset time periods.

Noticeably, the rule in the present embodiment means that a time of arrival at the destination reminder area for the first time in different preset time periods is all within a uniform predetermined range or within a predetermined range which is adjusted periodically.

It is appreciated that in the present embodiment, the judging whether time of reaching the identical or partially overlapping stay areas for the first time in the respective preset time periods complies with the rule comprises:

if the time of reaching the identical or partially overlapped stay areas for the first time in respective time periods is within a uniformly predetermined range or within a predetermined range which is adjusted periodically, the time of reaching the identical or partially overlapping stay areas for the first time in the respective preset time periods is judged as complying with the rule. For example, assume that the monitored person is a child, through step 104 the serve may automatically learn about the position point information of the portable locator and learn that the stay area of the child includes the school; through step 105, the server may automatically learn about the position point information of the portable locator and learn that the time of the child's arrival at the school for the first time in respective preset time periods is 7:30-8:00; furthermore, through self-learning, the server may learn that the child arrives at the school at 7:30-8:00 from Monday through Friday. Hence, the school may be set as the child's destination reminder area.

106: calculating an estimated arrival time of arrival at the destination reminder area according to the rule, or the user sets an estimated arrival time of arrival at the destination reminder area;

In an optional embodiment of the present invention, step 106, upon specific implementation, comprises:

regarding an average value of time of arrival for the first time in respective time periods as the estimated arrival time; or adding up the average value of time of arrival for the first time in respective time periods with the preset time period and regarding the sum as the estimated arrival time; or regarding the latest time of arrival for the first time in respective time periods as the estimated arrival time.

Take a child as an example. Assume that the school is the destination reminder area learned automatically, the server may make statistics of the time of arrival at the school for the first time in the respective preset time periods, obtain an average value of the time of the child's arrival at the school in the respective preset time periods, for example 7:45, 7:45 may be considered as the estimated time at which the child arrives at the school; or On the basis of the average value of the time at which the child arrives at the school, assume that a time (e.g., 15 minutes) is set, 8:00 may be considered as the estimated time at which the child arrives at the school; or if the server makes statistics of the time of the child's arrival at the school for the first time in the respective preset time periods as a range of 7:30-8:00, and the latest time at which the child arrives at the school for the first time in respective time periods is 8:00, 8:00 may be considered as the estimated time at which the child arrives at the school.

It is appreciated that in the present embodiment, the user may set the estimated arrival time of arriving at the destination reminder area, and the present invention does not limit in this regard.

It is appreciated that the user comprises a network account logged onto the designated server and already authorized to obtain information related to the portable locator, or comprises a monitoring terminal registered in the designated server and bound with the portable locator.

107: judging whether there is a position point indicative of arrival at the destination reminder area in the current preset time period, and generating and issuing a non-arrival reminder if there is not such position point and the current time has already exceeded the estimated arrival time;

For example, the estimated time at which the child arrives at the school is 8:00; if the child does not arrive at the school at 8:00 today, the non-arrival reminder is issued, and then the server for example may transmit said non-arrival reminder to the monitoring terminal; or the user uses the network account to log on the server to obtain the non-arrival reminder.

In the embodiment of the present invention, the server, according to the position point information transmitted by the portable locator, judges that there is not a position point indicative of arrival at the destination reminder area in the current preset time period, and furthermore, generates and issues the non-arrival reminder when the current time has already exceeded the estimated arrival time. In this way, the guardian knows that the monitored person carrying the portable locator does not arrive at the destination reminder area within the preset arrival time, and thereby masters the safety information of the monitored person, whereby the user experience is improved and subsequent missing person-seeking effectiveness is enhanced.

Figure 2:
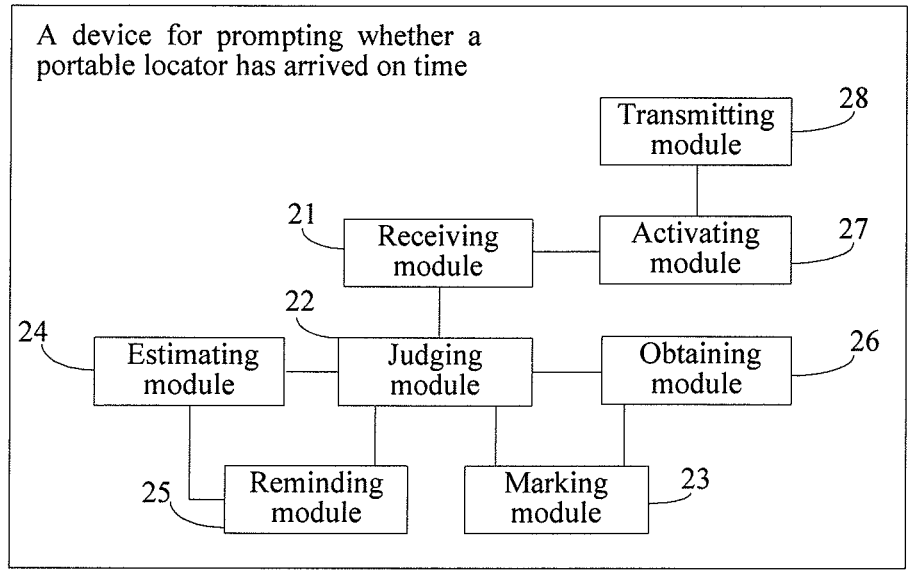
FIG. 2 is a structural schematic view of a device for prompting whether a portable locator has arrived on time according to an embodiment of the present invention.

FIG. 2 is a structural schematic view of a device for prompting whether a portable locator has arrived on time according to another embodiment of the present invention; as shown in FIG. 2, the device comprises:

a receiving module 21 configured to receive and record position point information and a positioning time corresponding to the position point information transmitted by the portable locator;

a judging module 22 configured to generate a location area according to the position point corresponding to the position point information, and judge whether the number of position points corresponding to other position information occurring again in the location area in a preset time period exceeds a threshold;

a marking module 23 configured to mark the location area as a stay area corresponding to the preset time period when the judging module 22 judges the number of position points corresponding to other position information occurring again in the location area in a preset time period exceeds the threshold;

the marking module 23 is further configured to mark the stay area as the destination reminder area when the judging module 22 judges, for multiple different preset time periods, the number of stay areas corresponding to respective preset time periods which are identical or partially overlapped exceeds a threshold, and judges that time of reaching the identical or partially overlapped stay areas for the first time in the respective preset time periods complies with the rule;

an estimating module 24 configured to calculate an estimated arrival time of arrival at the destination reminder area according to the rule, or enable the user to set an estimated arrival time of arrival at the destination reminder area;

a reminding module 25 configured to generate and issue a non-arrival reminder when the judging module 22 judges that is not a position point indicative of arrival at the destination reminder area in the current preset time period, and the current time has already exceeded the estimated arrival time.

Optionally, the device further comprises:

an obtaining module 26 configured to obtain a positioning time corresponding to the position point appearing for the first time in the location area and a positioning time corresponding to the position point appearing for the last time in the location area, and calculate a time length between the two positioning times;

the marking module 23 is further configured to mark the location area as a stay area corresponding to the preset time period if the judging module 22 judges that the time length reaches a time threshold; or, calculate a proportion of the number of position points appearing in the location area in the time length to the number of position points corresponding to all position point information recorded in the time length, and mark the location area as the stay area corresponding to the preset time period if the proportion is higher than a preset value.

Optionally, the rule means that a time of arrival at the destination reminder area for the first time in different preset time periods is all within a uniformly predetermined range or within a predetermined range which is adjusted periodically.

Optionally, the time of arrival at the identical or partially overlapped stay areas for the first time in respective preset time periods refers to a positioning time corresponding to the position point at which the portable locator appears for the first time at the identical or overlapped stay areas in the respective preset time periods.

Optionally, the judging module 22 is specifically configured to:

if the time of reaching the identical or partially overlapped stay areas for the first time in respective time periods is within a uniformly predetermined range or within a predetermined range which is adjusted periodically, judge the time of reaching the identical or partially overlapped stay areas for the first time in the respective preset time periods as complying with the rule.

Optionally, the estimating module 24 is specifically configured to:

regard an average value of time of arrival for the first time in respective time periods as the estimated arrival time; or add up the average value of time of arrival for the first time in respective time periods with the preset time period and regard the sum as the estimated arrival time; or regard the latest time of arrival for the first time in respective time periods as the estimated arrival time.

Optionally, the judging module 22 is specifically configured to:

make statistics for the number of position points corresponding to the position point information in the location area, the position point information is the already-recorded position point information in the same preset time period as a preset time period including the positioning time of the position point information, and judge whether the number exceeds a threshold.

Optionally, the location area generated according to the position point corresponding to the position point information is:

according to the position point information, consider a natural geographical area where a position point corresponding to the position point information lies as the location area corresponding to the position point information; or with the position point corresponding to the position point information as a center, consider a surrounding area of a preset radius as the location area corresponding to the position point information; or judge there are multiple position points neighboring the position point corresponding to the position point information, and determine the location area corresponding to the position point information according to a distance between the position point and the multiple neighboring position points.

Optionally, the receiving module 21 is further configured to receive an activation request transmitted by a monitoring terminal, the activation request comprising an identifier of the portable locator.

The device further comprises:

an activating module 27 is configured to activate the portable locator corresponding to the identifier of the portable locator according to the identifier of the portable locator included in the activation request, so that the activated portable locator transmits position point information to the server.

Optionally, the device further comprises:

a transmitting module 28 configured to transmit to the portable locator a time interval of reporting the position point information or a reporting time so that the portable locator regularly transmits the position point information of the portable locator to the server according to the above time interval or reporting time.

Optionally, the user comprises a network account logged onto the designated server and already authorized to obtain information related to the portable locator, or comprises a monitoring terminal registered in the designated server and bound with the portable locator.

Optionally, the transmitting module 28 is further configured in a way that the server transmits the non-arrival reminder to the monitoring terminal.

In the embodiment of the present invention, the server, according to the position point information transmitted by the portable locator, judges that there is not a position point indicative of arrival at the destination reminder area in the current preset time period, and furthermore, generates and issues the non-arrival reminder when the current time has already exceeded the estimated arrival time. In this way, the guardian knows that the monitored person carrying the portable locator does not arrive at the destination reminder area within the preset arrival time, and thereby masters the safety information of the monitored person, whereby the user experience is improved and subsequent person search effectiveness is enhanced.

Figure 3:
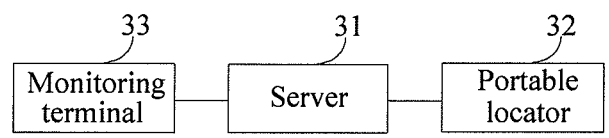
FIG. 3 is a structural schematic view of a system for prompting whether a portable locator has arrived on time according to an embodiment of the present invention.

FIG. 3 is a structural schematic view of a system for prompting whether a portable locator has arrived on time according to another embodiment of the present invention.

As shown in FIG. 3, the system comprises: a server 31, a portable locator 32 and a monitoring terminal 33;

The server 31 comprises the device for prompting whether a portable locator has arrived on time as stated in the embodiment shown in FIG. 2, and specific content thereof is no longer detailed here.

The monitoring terminal 33 is configured to send an activation request to the server, the activation request comprising an identifier of the portable locator, so that the server activates the portable locator corresponding to the identifier of the portable locator;

The portable locator 32 is configured to transmit position point information of the portable locator to the server after the server activates the portable locator.

In the embodiment of the present invention, the server, according to the position point information transmitted by the portable locator, judges whether there is a position point indicative of arrival at the destination reminder area in the current preset time period, and generates a non-arrival reminder if there is not such position point and the current time has already exceeded the estimated arrival time, to advise the monitoring terminal that the portable locator does not arrive at the stay area within the preset arrival time. In this way, it is ensured that the guardian holding the monitoring terminal knows at any time whether the monitored person carrying the portable locator has arrived at the destination on time, and thereby masters the safety information of the monitored person, whereby the user experience is improved and subsequent person search effectiveness is enhanced.

Embodiment 2

Noticeably, a monitoring terminal mentioned in embodiment of the present invention for example includes a mobile monitoring terminal (handset) held by a guardian.

A portable locator includes a bracelet-like portable locator worn on a wrist of a monitored person. The portable locator for example has a GPS positioning function; again for example further has GPRS communication function; again for example further a GSM communication function; again for example has a Bluetooth communication function; again for example further has an EDGE communication function; again for example further has a CDMA communication function; again for example further has a WCDMA communication function; again for example further has a TD-SCDMA communication function; again for example further has a TD-LTE communication function; and again for example further has an LTE communication function; the server for example includes a server arranged in equipment such as a base station or a macro eNodeB.

Figure 4:
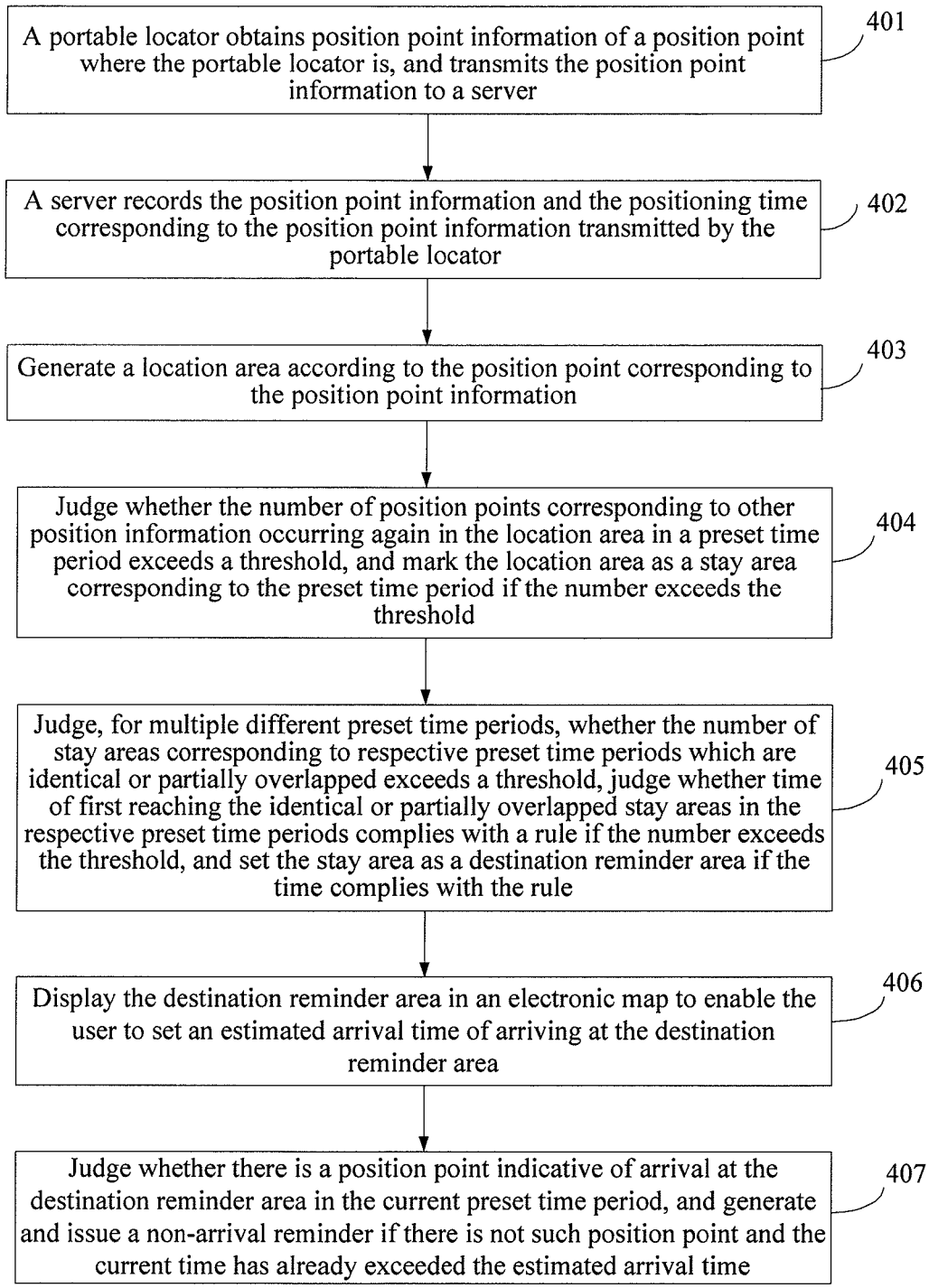
FIG. 4 is a flow chart of a method for prompting whether a portable locator has arrived on time according to another embodiment of the present invention.

FIG. 4 is a flow chart of a method for prompting whether a portable locator has arrived on time according to an embodiment of the present invention. As shown in FIG. 4, the method comprises step 401 to step 407;

401: The portable locator obtains position point information of a position point where it lies, and transmits the position point information to a server;

In an optional embodiment of the present invention, the method comprises prior to step 401:

The monitoring terminal sends an activation request to the server, wherein the activation request comprises an identifier of the portable locator; wherein the identifier of the portable locator for example comprises a QR code of the portable locator or a SIM card number set in the portable locator;

The server performs authorization verification for the monitoring terminal according to the identifier of the portable locator so that the monitoring terminal has a monitoring right to the portable locator, and activates the portable locator corresponding to the identifier so that the activated portable locator may transmit the position point information of the portable locator to the server.

Furthermore, the monitoring terminal may transmit to the activated portable locator via the server a time interval of reporting the position point information or a reporting time so that the portable locator regularly transmits the position point information of the portable locator to the server according to the above time interval or reporting time; or The server transmits to the portable locator a time interval of reporting the position point information or a reporting time so that the portable locator regularly transmits the position point information of the portable locator to the server according to the above time interval or reporting time; or The portable locator presets a time interval of reporting the position point information or the reporting time, and regularly transmits the position point information of the portable locator to the server according to the above time interval or reporting time.

402: The server records the position point information and the positioning time corresponding to the position point information transmitted by the portable locator;

403: generating a location area according to the position point corresponding to the position point information:

In an optional embodiment of the present invention, step 403, upon specific implementation, comprises:

according to the position point information, considering a natural geographical area where the position point corresponding to the position point information lies as the location area corresponding to the position point information; for example, assume when the natural geographical area is a school, a boundary of the school is a boundary of the natural geographical area so long as the position point occurring in the school belongs to the school as the natural geographical area; or with the position point corresponding to the position point information as a center, considering a surrounding area of a preset radius as the location area corresponding to the position point information; for example, with the position point reported by the locator as a center, considering an area within a surrounding scope of a preset radius (e.g., a radius of 20 meters) as the location area corresponding to the position point; or judging there are multiple position points neighboring the position point corresponding to the position point information, and determining the location area corresponding to the position point information according to a distance between the position point and the multiple neighboring position points; for example, if there are multiple position points neighboring the position point according to the position points reported by the locator, assume a preset distance of neighborhood is 10 meters, an area constituted by the neighboring position points within 10 meters (inclusive) relative to the position point may be considered as the location area corresponding to the position point.

404: judging whether the number of position points corresponding to other position information occurring again in the location area in a preset time period exceeds a threshold, and marking the location area as a stay area corresponding to the preset time period if the number exceeds the threshold;

In an optional embodiment of the present invention, step 404, upon specific implementation, comprises:

making statistics for the number of position points corresponding to the position point information in the location area, the position point information is the already-recorded position point information in the same preset time period as a preset time period including the positioning time of the position point information lies; for example, making statistics of multiple position point information already recorded by the server and reported by the locator within a preset time period (one day ore several hours), respectively determining position points corresponding to the multiple position point information, determining which position points fall within the location area determined in step 403 according to respective position points, and making statistics of the number of position points falling within the location area determined in step 403; for example, presetting two hours to make statistics of the number of position points in a certain location area once, specifically, calculation may be performed as to whether the number of position points appearing in the location area within two hours counted from the positioning time of the first position point information exceeds a threshold, and the position points appearing in the location area after two hours can only participate in next statistics of the number of position points in the location area.

In the present embodiment, the preset threshold may be specifically set according to different location areas. For example, when the monitored person is a child, school and home, the two location areas, are safe location areas, stay in the two location areas is relatively longer, there are relatively more position point information recorded in the two location areas, so the threshold for the number of position points in the two location areas is relatively larger.

In an optional embodiment of the present invention, step 404, upon specific implementation, comprises:

obtaining, in a preset time period, a positioning time corresponding to the position point appearing for the first time in the location area and a positioning time corresponding to the position point appearing for the last time in the location area, and calculating a time length between the two positioning times;

judging whether the time length reaches a time threshold; if the time length reaches the time threshold, marking the location area as a stay area corresponding to the preset time period; or, calculating a proportion of the number of position points appearing in the location area in the time length to the number of position points corresponding to all position point information recorded in the time length, and marking the location area as the stay area corresponding to the preset time period if the proportion is higher than a preset value.

Noticeably, in the present embodiment, the preset time period may be one day or a certain fixed time period of each day, or even each interval of a fixed time period, for example, every 12 hours may be regarded as the preset time period.

It needs to be appreciated that a rule in the present embodiment is illustrated by way of an example; if the school becomes the stay area, the rule of going to school at the school as the location area from Monday through Friday may be automatically learnt according to the position point information reported by the portable locator that, and it is automatically learnt that the school is set as the stay area according to the rule of going to school at the school as the location area from Monday through Friday.

405: judging, for multiple different preset time periods, whether the number of stay areas corresponding to respective preset time periods which are identical or partially overlapped exceeds a threshold, judging whether time of reaching the identical or partially overlapped stay areas for the first time in the respective preset time periods complies with the rule if the number exceeds the threshold, and setting the stay area as a destination reminder area if the time complies with the rule.

It is appreciated that the time of arrival at the identical or partially overlapped stay areas for the first time in respective preset time periods refers to a positioning time corresponding to the position point at which the portable locator appears the first at the identical or overlapped stay areas in the respective preset time periods.

Noticeably, the rule in the present embodiment means that a time of arrival at the destination reminder area for the first time in different preset time periods is all within a uniformly predetermined range or within a predetermined range which is adjusted periodically.

It is appreciated that in the present embodiment, the judging whether time of reaching the identical or partially overlapped stay areas for the first time in the respective preset time periods complies with the rule comprises:

If the time of reaching the identical or partially overlapped stay areas for the first time in respective time periods is within a uniformly predetermined range or within a predetermined range which is adjusted periodically, the time of reaching the identical or partially overlapped stay areas for the first time in the respective preset time periods is judged as complying with the rule. For example, assume that the monitored person is a child, through step 404 the serve may automatically learn about the position point information of the portable locator and learn that the stay area of the child includes the school; through step 405, the server may automatically learn about the position point information of the portable locator and learn that the time of the child's arrival at the school for the first time in respective preset time periods is 7:30-8:00; furthermore, through self-learning, the server may learn that the child arrives at the school at 7:30-8:00 from Monday through Friday. Hence, the school may be set as the child's destination reminder area.

406. displaying the destination reminder area in an electronic map to enable the user to set an estimated time of arriving at the destination reminder area;

By way of example, the above generated destination reminder areas may be displayed differently through the electronic map so that the already-set destination reminder areas and displayed by the electronic map are displayed with different sizes, colors, brightness and transparency. Then, the user uses the network account to log on the server to set the estimated time of arriving at the destination reminder area. Specifically, For example, regarding an average value of time of arrival for the first time in respective time periods as the estimated arrival time; or again for example, adding up the average value of time of arrival for the first time in respective time periods with the preset time period and regarding the sum as the estimated arrival time; or again for example, regarding the latest time of arrival for the first time in respective time periods as the estimated arrival time.

Take a child as an example. Assume that the school is the destination reminder area learned automatically, the server may make statistics of the time of arrival at the school for the first time in the respective preset time periods, obtain an average value of the time of the child's arrival at the school in the respective preset time periods, for example 7:45, 7:45 may be considered as the estimated time at which the child arrives at the school; or On the basis of the average value of the time at which the child arrives at the school, assume that a time (e.g., 15 minutes) is set, 8:00 may be considered as the estimated time at which the child arrives at the school; or if the server makes statistics of the time of the child's arrival at the school for the first time in the respective preset time periods as a range of 7:30-8:00, and the latest time at which the child arrives at the school for the first time in respective time periods is 8:00, 8:00 may be considered as the estimated time at which the child arrives at the school.

It is appreciated that in the present embodiment, the user may set the estimated time of arriving at the destination reminder area, and the present invention does not limit in this regard.

It is appreciated that the user comprises a network account logged onto the designated server and already authorized to obtain information related to the portable locator, or comprises a monitoring terminal registered in the designated server and bound with the portable locator.

407: judging whether there is a position point indicative of arrival at the destination reminder area in the current preset time period, and generating and issuing a non-arrival reminder if there is not such position point and the current time has already exceeded the estimated arrival time;

For example, the estimated time at which the child arrives at the school is 8:00; if the child does not arrive at the school at 8:00 today, the non-arrival reminder is issued, and then the server for example may transmit said non-arrival reminder to the monitoring terminal; or the user uses the network account to log on the server to obtain the non-arrival reminder.

In the embodiment of the present invention, the server, according to the position point information transmitted by the portable locator, judges that there is not a position point indicative of arrival at the destination reminder area in the current preset time period, and furthermore, generates and issues the non-arrival reminder when the current time has already exceeded the estimated arrival time. In this way, the guardian knows that the monitored person carrying the portable locator does not arrive at the destination reminder area within the preset arrival time, and thereby masters the safety information of the monitored person, whereby the user experience is improved and subsequent person search effectiveness is enhanced.

Figure 5:
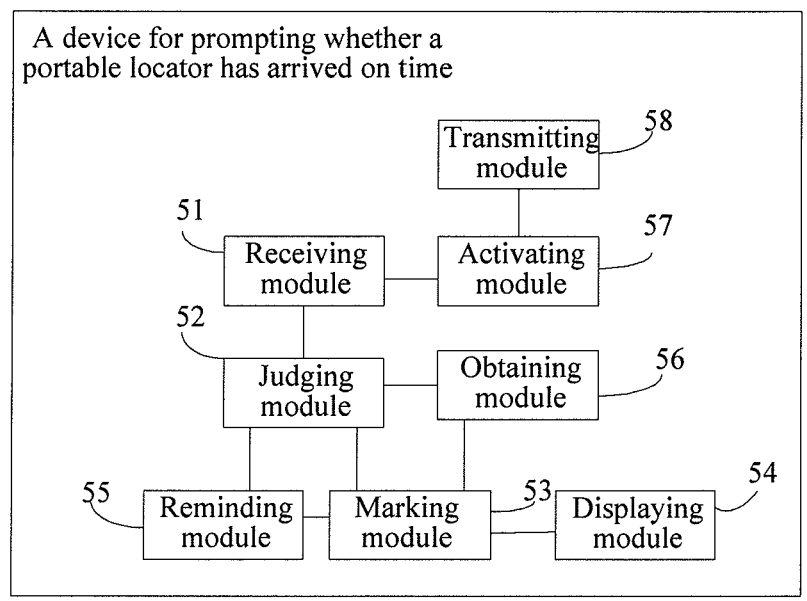
FIG. 5 is a structural schematic view of a device for prompting whether a portable locator has arrived on time according to another embodiment of the present invention.

FIG. 5 is a structural schematic view of a device for prompting whether a portable locator has arrived on time according to another embodiment of the present invention. As shown in FIG. 5, the device comprises:

a receiving module 51 configured to receive and record position point information and a positioning time corresponding to the position point information transmitted by the portable locator;

a judging module 52 configured to generate a location area according to the position point corresponding to the position point information, and judge whether the number of position points corresponding to other position information occurring again in the location area in a preset time period exceeds a threshold;

a marking module 53 configured to mark the location area as a stay area corresponding to the preset time period when the judging module 52 judges the number of position points corresponding to other position information occurring again in the location area in a preset time period exceeds the threshold;

the marking module 53 is further configured to mark the stay area as the destination reminder area when the judging module 52 judges, for multiple different preset time periods, the number of stay areas corresponding to respective preset time periods which are identical or partially overlapped exceeds a threshold, and judges that time of reaching the identical or partially overlapped stay areas for the first time in the respective preset time periods complies with the rule;

a displaying module 54 configured to display the destination reminder area marked by the marking module 53 in an electronic map to enable the user to set an estimated time of arriving at the destination reminder area; Specifically, for example, the marked destination reminder area may be displayed through the electronic map;

a reminding module 55 configured to generate and issue a non-arrival reminder when the judging module 52 judges that is not a position point indicative of arrival at the destination reminder area in a current preset time period, and the current time has already exceeded the estimated arrival time.

Optionally, the device further comprises:

an obtaining module 56 configured to obtain a positioning time corresponding to the position point appearing for the first time in the location area and a positioning time corresponding to the position point appearing for the last time in the location area, and calculate a time length between the two positioning times;

the marking module 53 is further configured to mark the location area as a stay area corresponding to the preset time period if the judging module 52 judges that the time length reaches a time threshold; or, calculate a proportion of the number of position points appearing in the location area in the time length to the number of position points corresponding to all position point information recorded in the time length, and mark the location area as the stay area corresponding to the preset time period if the proportion is higher than a preset value.

Optionally, the rule means that a time of arrival at the destination reminder area for the first time in different preset time periods is all within a uniformly predetermined range or within a predetermined range which is adjusted periodically.

Optionally, the time of arrival at the identical or partially overlapped stay areas for the first time in respective preset time periods refers to a positioning time corresponding to the position point at which the portable locator appears for the first time at the identical or overlapped stay areas in the respective preset time periods.

Optionally, the judging module 52 is specifically configured to:

if the time of reaching the identical or partially overlapped stay areas for the first time in respective time periods is within a uniformly predetermined range or within a predetermined range which is adjusted periodically, judge the time of reaching the identical or partially overlapped stay areas for the first time in the respective preset time periods as complying with the rule.

Optionally, the displaying module 54 is specifically configured to display already-set destination reminder areas and displayed by the electronic map with different sizes, colors, brightness and transparency.

Optionally, the estimated arrival time set by the user is:

an average value of time of arrival at the destination reminder area for the first time in respective time periods; or the average value of time of arrival at the destination reminder area for the first time in respective time periods added up with the preset time period; or the latest time of arrival at the destination reminder area for the first time in respective time periods.

Optionally, the judging module 52 is specifically configured to:

make statistics for the number of position points corresponding to the position point information in the location area, the position point information is the already-recorded position point information in the same preset time period as a preset time period including the positioning time of the position point information, and judge whether the number exceeds the threshold.

Optionally, the location area generated according to the position point corresponding to the position point information is:

according to the position point information, consider a natural geographical area where a position point corresponding to the position point information lies as the location area corresponding to the position point information; or with the position point corresponding to the position point information as a center, consider a surrounding area of a preset radius as the location area corresponding to the position point information; or judge there are multiple position points neighboring the position point corresponding to the position point information, and determine the location area corresponding to the position point information according to a distance between the position point and the multiple neighboring position points.

Optionally, the receiving module 51 is further configured to receive an activation request transmitted by a monitoring terminal, the activation request comprising an identifier of the portable locator.

The device for example further comprises:

an activating module 57 is configured to activate the portable locator corresponding to the identifier of the portable locator according to the identifier of the portable locator included in the activation request, so that the activated portable locator transmits position point information to the server.

a transmitting module 58 configured to transmit to the portable locator a time interval of reporting the position point information or a reporting time so that the portable locator regularly transmits the position point information of the portable locator to the server according to the above time interval or reporting time.

Optionally, the user comprises a network account logged onto the designated server and already authorized to obtain information related to the portable locator, or comprises a monitoring terminal registered in the designated server and bound with the portable locator.

Optionally, the transmitting module 58 is further configured to transmit the non-arrival reminder to the monitoring terminal.

In the embodiment of the present invention, the server, according to the position point information transmitted by the portable locator, judges that there is not a position point indicative of arrival at the destination reminder area in the current preset time period, and furthermore, generates and issues the non-arrival reminder when the current time has already exceeded the estimated arrival time. In this way, the guardian knows that the monitored person carrying the portable locator does not arrive at the destination reminder area within the preset arrival time, and thereby masters the safety information of the monitored person, whereby the user experience is improved and subsequent person search effectiveness is enhanced.

The present embodiment further provides a structural schematic view of a system for prompting whether a portable locator has arrived on time. As shown in FIG. 3, the system comprises: a server 31, a portable locator 32 and a monitoring terminal 33;

The server 31 comprises the device for prompting whether a portable locator has arrived on time as stated in the embodiment shown in FIG. 5, and specific content thereof is no longer detailed here.

The monitoring terminal 33 is configured to send an activation request to the server, the activation request comprising an identifier of the portable locator, so that the server activates the portable locator corresponding to the identifier of the portable locator;

The portable locator 32 is configured to transmit position point information of the portable locator to the server after the server activates the portable locator.

In the embodiment of the present invention, the server, according to the position point information transmitted by the portable locator, judges there is not a position point indicative of arrival at the destination reminder area in the current preset time period, and generates and issues a non-arrival reminder when the current time has already exceeded the estimated arrival time. In this way, the guardian knows that the monitored person carrying the portable locator does not arrive at the destination reminder area within the preset arrival time, and thereby masters the safety information of the monitored person, whereby the user experience is improved and subsequent person search effectiveness is enhanced.

Embodiment 3

Noticeably, a monitoring terminal mentioned in embodiment of the present invention for example includes a mobile monitoring terminal (mobile phone) held by a guardian.

A portable locator includes a bracelet-like portable locator worn on a wrist of a monitored person. The portable locator for example has a GPS positioning function; again for example further has a GPRS communication function; again for example further a GSM communication function; again for example has a Bluetooth communication function; again for example further has an EDGE communication function; again for example further has a CDMA communication function; again for example further has a WCDMA communication function; again for example further has a TD-SCDMA communication function; again for example further has a TD-LTE communication function; and again for example further has an LTE communication function;

The server for example includes a server arranged in equipment such as a base station or a macro eNodeB.

Figure 6:
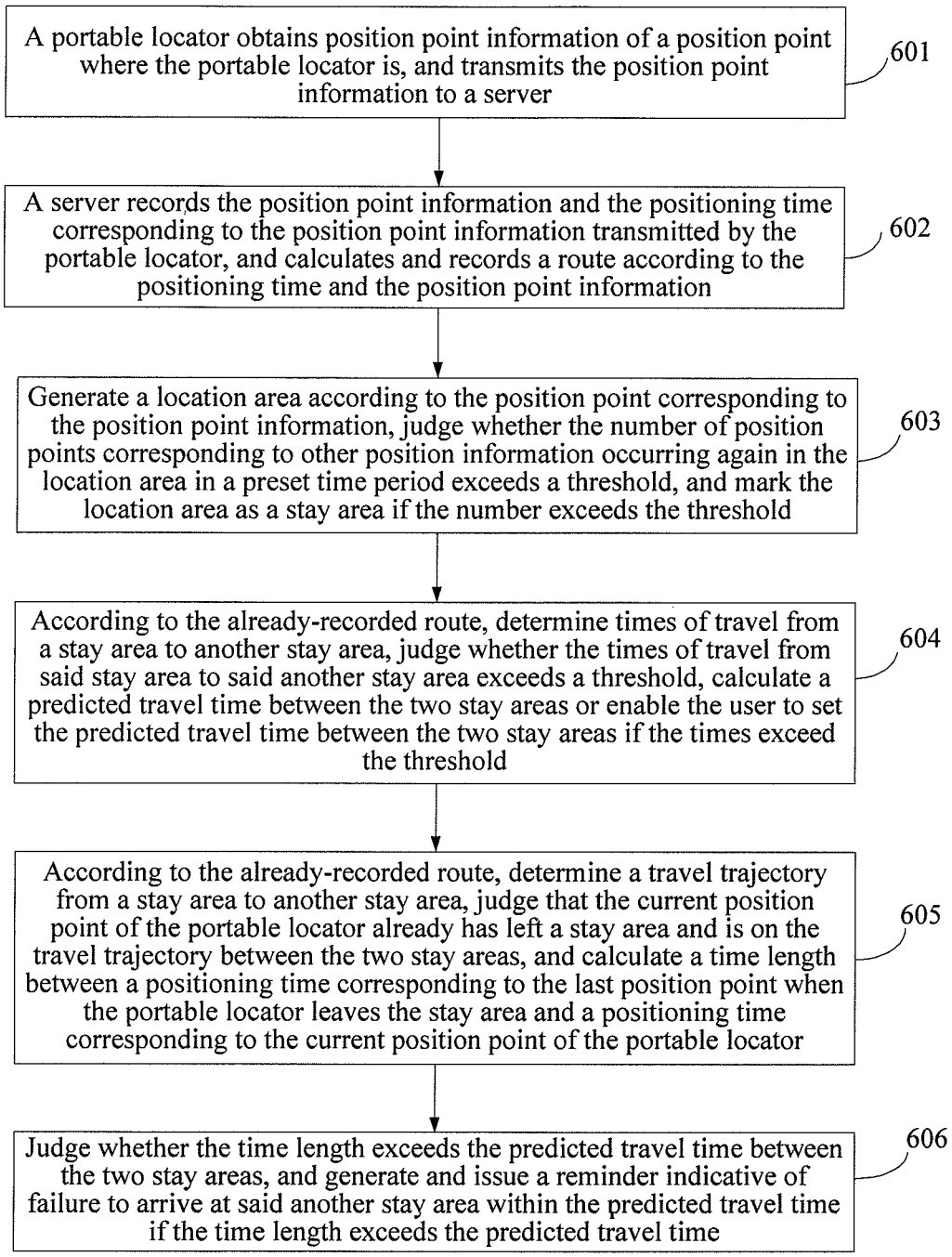
FIG. 6 is a flow chart of a method for prompting whether a portable locator has arrived on time according to a further embodiment of the present invention.

FIG. 6 is a flow chart of a method for prompting whether a portable locator has arrived on time according to an embodiment of the present invention. As shown in FIG. 6, the method comprises step 601 to step 607;

601: The portable locator obtains position point information of a position point where it lies, and transmits the position point information to a server;

In an optional embodiment of the present invention, the method comprises prior to step 601:

The monitoring terminal sends an activation request to the server, wherein the activation request comprises an identifier of the portable locator; wherein the identifier of the portable locator for example comprises a QR code of the portable locator or a SIM card number set in the portable locator;

The server performs authorization verification for the monitoring terminal according to the identifier of the portable locator so that the monitoring terminal has a monitoring right to the portable locator, and activates the portable locator corresponding to the identifier so that the activated portable locator may transmit the position point information of the portable locator to the server.

Furthermore, the monitoring terminal may transmit to the activated portable locator via the server a time interval of reporting the position point information or a reporting time so that the portable locator regularly transmits the position point information of the portable locator to the server according to the above time interval or reporting time; or The server transmits to the portable locator a time interval of reporting the position point information or a reporting time so that the portable locator regularly transmits the position point information of the portable locator to the server according to the above time interval or reporting time; or The portable locator presets a time interval of reporting the position point information or the reporting time, and regularly transmits the position point information of the portable locator to the server according to the above time interval or reporting time.

602: The server records the position point information and the positioning time corresponding to the position point information transmitted by the portable locator, and calculates and records a route according to the positioning time and the position point information;

Specifically, in the preset time period the server records the route of the portable locator according to the position point information and the positioning time corresponding to the position point information transmitted by the portable locator. For example, from 7:00 am-8:00 am each day in a week, the server records the position point information and the positioning time corresponding to the position point information transmitted by the portable locator and may obtain that the route of the portable locator goes from home to school from 7:00 am-8:00 am each day.

603: generating a location area according to the position point corresponding to the position point information, judging whether the number of position points corresponding to other position information occurring again in the location area in a preset time period exceeds a threshold, and marking the location area as a stay area if the number exceeds the threshold;

In an optional embodiment of the present invention, the generating a location area according to the position point corresponding to the position point information comprises upon specific implementation:

according to the position point information, considering a natural geographical area where the position point corresponding to the position point information lies as the location area corresponding to the position point information; for example, assume when the natural geographical area is a school, a boundary of the school is a boundary of the natural geographical area so long as the position point occurring in the school belongs to the school as the natural geographical area; or with the position point corresponding to the position point information as a center, considering a surrounding area of a preset radius as the location area corresponding to the position point information; for example, with the position point reported by the locator as a center, considering an area within a surrounding scope of a preset radius (e.g., a radius of 20 meters) as the location area corresponding to the position point; or judging there are multiple position points neighboring the position point corresponding to the position point information, and determining the location area corresponding to the position point information according to a distance between the position point and the multiple neighboring position points; for example, if there are multiple position points neighboring the position point according to the position points reported by the locator, assume a preset distance of neighborhood is 10 meters, an area constituted by the neighboring position points within 10 meters (inclusive) relative to the position point may be considered as the location area corresponding to the position point.

In an optional embodiment of the present invention, step 604, upon specific implementation, comprises:

making statistics for the number of position points corresponding to the position point information in the location area, the position point information is the already-recorded position point information in the same preset time period as a preset time period including the positioning time of the position point information lies; for example, making statistics of multiple position point information already recorded by the server and reported by the locator within a preset time period (one day ore several hours), respectively determining position points corresponding to the multiple position point information, determining which position points fall within the location area determined in step 603 according to respective position points, and making statistics of the number of position points falling within the location area determined in step 603; for example, presetting two hours to make statistics of the number of position points in a certain location area once, specifically, calculation may be performed as to whether the number of position points appearing in the location area within two hours counted from the positioning time of the first position point information exceeds a threshold, and the position points appearing in the location area after two hours can only participate in next statistics of the number of position points in the location area.

In the present embodiment, the preset threshold may be specifically set according to different location areas. For example, when the monitored person is a child, school and home, the two location areas, are safe location areas, stay in the two location areas is relatively longer, there are relatively more position point information recorded in the two location areas, so the threshold for the number of position points in the two location areas is relatively larger.

In an optional embodiment of the present invention, step 604, upon specific implementation, comprises:

obtaining, in a preset time period, a positioning time corresponding to the position point appearing for the first time in the location area and a positioning time corresponding to the position point appearing for the last time in the location area, and calculating a time length between the two positioning times;

judging whether the time length reaches a time threshold; if the time length reaches the time threshold, marking the location area as a stay area corresponding to the preset time period; or in the time length, calculating a proportion of the number of position points appearing in the location area to the number of position points corresponding to all position point information recorded in the time length, and marking the location area as the stay area corresponding to the preset time period if the proportion is higher than a preset value.

Noticeably, in the present embodiment, the preset time period may be one day or a certain fixed time period of each day, or even each interval of a fixed time period, for example, every 12 hours may be regarded as the preset time period.

It needs to be appreciated that a rule in the present embodiment is illustrated by way of an example; if the school becomes the stay area, the rule of going to school at the school as the location area from Monday through Friday may be automatically learnt according to the position point information reported by the portable locator that, and it is automatically learnt that the school is set as the stay area according to the rule of going to school at the school as the location area from Monday through Friday.

604: according to the already-recorded route, determining times of travel from a stay area to another stay area, judging whether the times of travel from a stay area to another stay area exceeds a threshold, calculating a predicted travel time between the two stay areas or the user setting the predicted travel time between the two stay areas if the times exceed the threshold;

Specifically, the calculating a predicted travel time between the two stay areas comprises:

according to the already-recorded route, determining times of travel from a stay area to another stay area, summating travel time from a stay area to another stay area each time and then dividing it by the times of travel to obtain the predicted travel time between the two stay areas.

For example, the above server, from 7:00 am-8:00 am every day in a week, records the position point information and the positioning time corresponding to the position point information transmitted by the portable locator, and works out that the route of the portable locator is from home (as a stay area) to school (another stay area) from 7:00 am-8:00 am every day from Monday through Friday, the times of travel are five, and the portable locator is at home 7:00 am-8:00 am every day from Saturday to Sunday. The route of the portable locator from home to school from 7:00 am-8:00 am every day from Monday through Friday may be learnt. The times (e.g., five times) of travel from home to school are determined according to the already-recorded route. The travel time from said one stay area to said another stay area each time (45 minutes+50 minutes+40 minutes+48 minutes+46 minutes) is summated and the sum is divided by the times of travel (five times) to obtain the predicted travel time between the two stay areas is 45 minutes.

For example, the user may use the network account to log on the server to set the predicted travel time between the two stay areas.

Wherein, the user in the present embodiment comprises a network account logged onto the designated server and already authorized to obtain information related to the portable locator, or comprises a monitoring terminal registered in the designated server and bound with the portable locator.

605: according to the already-recorded route and a trajectory rule and/or time rule, upon judging that the current position point of the portable locator already leaves a stay area and judging a target area of the portable locator is another stay area, obtaining a positioning time corresponding to the position point of the portable locator appearing for the last time in the said stay area and a positioning time corresponding to the current position point of the portable locator, and calculating a time length between the two positioning times;

Noticeably, in the present embodiment, the trajectory rule refers to a travel trajectory from one stay area to another stay area generated according to all position point information between the stay area and another stay area and the positioning time corresponding to respective position point information in different preset time periods according to the already-recorded route;

The time rule refers to, according to a positioning time corresponding to the position point of the portable locator appearing for the last time in the stay area in different preset time periods according to the already-recorded route, determining a departure time when the portable locator leaves the stay area is all within a uniform predetermined range or within a predetermined range which is adjusted periodically.

In an optional embodiment of the present invention, the step of, according to the already-recorded route and a trajectory rule, judging that the current position point of the portable locator already leaves a stay area and judging a target area of the portable locator is another stay area comprises:

according to the already-recorded route, determining a travel trajectory from a stay area to another stay area, judging the current position point of the portable locator already leaves the stay area and on the travel trajectory between the two stay areas, then judging that the target area of the portable locator is another stay area.

In an optional embodiment of the present invention, the step of, according to the already-recorded route and a time rule, judging that the current position point of the portable locator already leaves a stay area and judging a target area of the portable locator is another stay area comprises:

according to the already-recorded route, within the current preset time period, judging a departure area of the portable positioning area is the stay area and judging a positioning time corresponding to a position point of the portable locator appearing for the last time in the stay area is within a uniform predetermined range or within a predetermined range which is adjusted periodically, and judging that the target area of the portable locator is another stay area.

In an optional embodiment of the present invention, the determining the travel trajectory from said one stay area to said another stay area as stated above comprises upon specific implementation:

generating the travel trajectory from said one stay area to said another stay area according to the already-recorded route as well as all position point information from said stay area to said another stay area and the positioning time corresponding to respective position point information.

For example, according to the route already recorded by the server in a preset time period, obtaining all position point information from home to school and the positioning time corresponding to respective position point information, and at least generating a travel trajectory from home to school; for example, in the preset time period (7:00 am to 8:00 am every day), according to the recorded times of travel from home to school, determining the portable locator mostly travels on the same road, and setting the road as the travel trajectory from home to school corresponding to the preset time period.

Then, judging, within the current preset time period (7:00 am-8:00 am), that the current position point of the portable locator already leaves the stay area (home) and is on the travel trajectory (the road often taken from home to school) between the two stay areas, and then calculating a time length between a positioning time when the portable locator leaves the last position point of the stay area (home) and a positioning time corresponding to the current position point of the portable locator.

606: judging whether the time length exceeds the predicted travel time between the two stay areas, and generating and issuing a reminder indicative of failure to arrive at said another stay area within the predicted travel time if the time length exceeds the predicted travel time.

The reminder indicative of failure to arrive at said another stay area within the predicted travel time may be generated and issued if the time length between a positioning time when the portable locator leaves the last position point of the stay area (home) and a positioning time corresponding to the current position point of the portable locator is judged as exceeding the predicted travel time (predicted travel time of 45 minutes from home to school) between the two stay areas.

Then, the server for example transmits to the monitoring terminal the reminder indicative of failure to arrive at said another stay area within the predicted travel time; or The user for example may use the network account to log on the server to obtain the reminder indicative of failure to arrive at said another stay area within the predicted travel time.

For example, assume that the child fails to reach the school within a usual travel time period, e.g., a usual travel time period of 45 minutes from home to school, the reminder indicative of failure to arrive at said another stay area within the predicted travel time is transmitted.

In the present embodiment of the present invention, the server, according to the already-recorded route, determines the travel trajectory from one stay area to another stay area, judges that the current position point of the portable locator already leaves the stay area and is on the travel trajectory between the two stay areas, and then calculates a time length between a positioning time when the portable locator leaves the last position point of the stay area and a positioning time corresponding to the current position point of the portable locator; judges whether the time length exceeds the predicted travel time between the two stay areas, and generates and issues a reminder indicative of failure to arrive at said another stay area within the predicted travel time if the time length exceeds the predicted travel time. In this way, it is ensured that the guardian holding the monitoring terminal knows at any time whether the monitored person carrying the portable locator has arrived at the destination on time, and thereby masters the safety information of the monitored person, whereby the user experience is improved and subsequent missing person-seeking effectiveness is enhanced.

Figure 7:
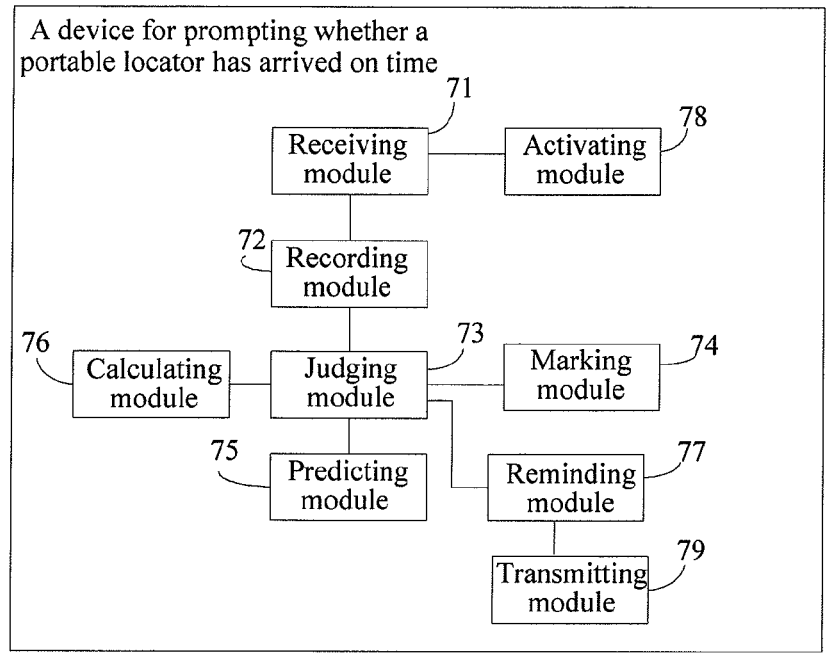
FIG. 7 is a structural schematic view of a device for prompting whether a portable locator has arrived on time according to a further embodiment of the present invention.

FIG. 7 is a structural schematic view of a device for prompting whether a portable locator has arrived on time according to another embodiment of the present invention. As shown in FIG. 7, the device comprises:

a receiving module 71 configured to receive position point information and a positioning time corresponding to the position point information transmitted by the portable locator;

a recording module 72 configured to calculate and record a route according to the position point information and a positioning time corresponding to the position point information transmitted by the portable locator and received by the receiving module 71;

a judging module 73 configured to generate a location area according to the position point corresponding to the position point information, and judge whether the number of position points corresponding to other position information occurring again in the location area in a preset time period exceeds a threshold;

a marking module 74 configured to mark the location area as a stay area when the judging module 73 judges the number of position points corresponding to other position information occurring again in the location area in a preset time period exceeds the threshold;

a predicting module 75 configured to calculate a predicted travel time between the two stay areas when the judging module 73, according to the route already recorded by the recording module 72, determines times of travel from a stay area to another stay area as marked by the marking module 74, and judges the times of travel from a stay area to another stay area exceeds a threshold;

a calculating module 76 configured to obtain a positioning time corresponding to the position point of the portable locator appearing for the last time in the said stay area and a positioning time corresponding to the current position point of the portable locator, and calculate a time length between the two positioning times, when the judging module, according to the already-recorded route and a trajectory rule and/or time rule, judges that the current position point of the portable locator already leaves a stay area and judges a target area of the portable locator is another stay area;

a reminding module 77 configured to generate and issue a reminder indicative of failure to arrive at said another stay area within a predicted travel time when the judging module 73 judges the time length calculated by the calculating module 76 exceeds the predicted travel time between the two stay areas as predicted by the predicting module 75.

Optionally, the location area generated according to the position point corresponding to the position point information is:

according to the position point information, considering a natural geographical area where a position point corresponding to the position point information lies as the location area corresponding to the position point information; or with the position point corresponding to the position point information as a center, considering a surrounding area of a preset radius as the location area corresponding to the position point information; or judging there are multiple position points neighboring the position point corresponding to the position point information, and determining the location area corresponding to the position point information according to a distance between the position point and the multiple neighboring position points.

Optionally, the calculating module 76 is further configured to obtain, in a preset time period, a positioning time corresponding to the position point appearing for the first time in the location area and a positioning time corresponding to the position point appearing for the last time in the location area, and calculate a time length between the two positioning times;

The marking module 74 is further configured to, when the judging module judges whether the time length reaches a time threshold; marking the location area as a stay area corresponding to the preset time period; or in the time length, calculate a proportion of the number of position points appearing in the location area to the number of position points corresponding to all position point information recorded in the time length, and mark the location area as the stay area corresponding to the preset time period if the proportion is higher than a preset value.

Optionally, the predicting module 75 is specifically configured to, according to the already-recorded route, determine times of travel from a stay area to another stay area, summate travel time from a stay area to another stay area each time and then divide it by the times of travel to obtain the predicted travel time between the two stay areas.

Optionally, the trajectory rule refers to a travel trajectory from one stay area to another stay area generated according to all position point information between the stay area and another stay area and the positioning time corresponding to respective position point information in different preset time periods according to the already-recorded route;

Optionally, the time rule refers to, according to a positioning time corresponding to the position point of the portable locator appearing for the last time in the stay area in different preset time periods according to the already-recorded route, determining a departure time when the portable locator leaves the stay area is all within a uniform predetermined range or within a predetermined range which is adjusted periodically.

Optionally, the judging module 73 is specifically configured to:

according to the already-recorded route, determine a travel trajectory from a stay area to another stay area, judge the current position point of the portable locator already leaves the stay area and on the travel trajectory between the two stay areas, then judge that the target area of the portable locator is another stay area.

Optionally, the judging module 73 is specifically further configured to:

according to the already-recorded route, within the current preset time period, judge a departure area of the portable positioning area is the stay area and judge a positioning time corresponding to a position point of the portable locator appearing for the last time in the stay area is within a uniform predetermined range or within a predetermined range which is adjusted periodically, and judge that the target area of the portable locator is another stay area.

Optionally, the judging module 73 is further configured to judge the number of position points corresponding to the position point information in the location area, the position point information is the position point information already recorded in the same preset time period as a preset time period including the positioning time of the position point information exceeds a threshold.

Optionally, the receiving module 71 is configured to receive an activation request transmitted by the monitoring terminal, the activation request comprising an identifier of the portable locator;

Optionally, the device for example further comprises:

an activating module 78 configured to activate the portable locator corresponding to the identifier of the portable locator according to the identifier of the portable locator included in the activation request, so that the activated portable locator transmits position point information to the server.

a transmitting module 79 configured to transmit to the portable locator a time interval of reporting the position point information or a reporting time so that the portable locator regularly transmits the position point information of the portable locator to the server according to the above time interval or reporting time.

Optionally, the device is characterized in that it further comprises:

the user comprises a network account logged onto the designated server and already authorized to obtain information related to the portable locator, or comprises a monitoring terminal registered in the designated server and bound with the portable locator.

Optionally, the transmitting module 79 is further configured to transmit to the monitoring terminal a reminder indicative of failure to arrive at said another stay area within the predicted travel time.

In the present embodiment of the present invention, the server, according to the already-recorded route, determines the travel trajectory from one stay area to another stay area, judges that the current position point of the portable locator already leaves the stay area and is on the travel trajectory between the two stay areas, and then calculates a time length between a positioning time when the portable locator leaves the last position point of the stay area and a positioning time corresponding to the current position point of the portable locator; judges whether the time length exceeds the predicted travel time between the two stay areas, and generates and issues a reminder indicative of failure to arrive at said another stay area within the predicted travel time if the time length exceeds the predicted travel time. In this way, it is ensured that the guardian holding the monitoring terminal knows at any time whether the monitored person carrying the portable locator has arrived at the destination on time, and thereby masters the safety information of the monitored person, whereby the user experience is improved and subsequent missing person-seeking effectiveness is enhanced.

The present embodiment further provides a structural schematic view of a system for prompting whether a portable locator has arrived on time. As shown in FIG. 3, the system comprises: a server 31, a portable locator 32 and a monitoring terminal 33;

The server 31 comprises the device for prompting whether a portable locator has arrived on time as stated in the embodiment shown in FIG. 7;

The monitoring terminal 33 is configured to send an activation request to the server, the activation request comprising an identifier of the portable locator, so that the server activates the portable locator corresponding to the identifier of the portable locator;

The portable locator 32 is configured to transmit position point information of the portable locator to the server after the server activates the portable locator.

In the embodiment of the present invention, the server, according to the already-recorded route, determines the travel trajectory from one stay area to another stay area, judges that the current position point of the portable locator already leaves the stay area and is on the travel trajectory between the two stay areas, and then calculates a time length between a positioning time when the portable locator leaves the last position point of the stay area and a positioning time corresponding to the current position point of the portable locator; judges whether the time length exceeds the predicted travel time between the two stay areas, and generates and issues a reminder indicative of failure to arrive at said another stay area within the predicted travel time if the time length exceeds the predicted travel time. In this way, it is ensured that the guardian holding the monitoring terminal knows at any time whether the monitored person carrying the portable locator has arrived at the destination on time, and thereby masters the safety information of the monitored person, whereby the user experience is improved and subsequent missing person-seeking effectiveness is enhanced.

The description as provided here describes a lot of specific details. However, it is appreciated that embodiments of the present invention may be implemented in the absence of these specific details. Some embodiments do not specify detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 8:
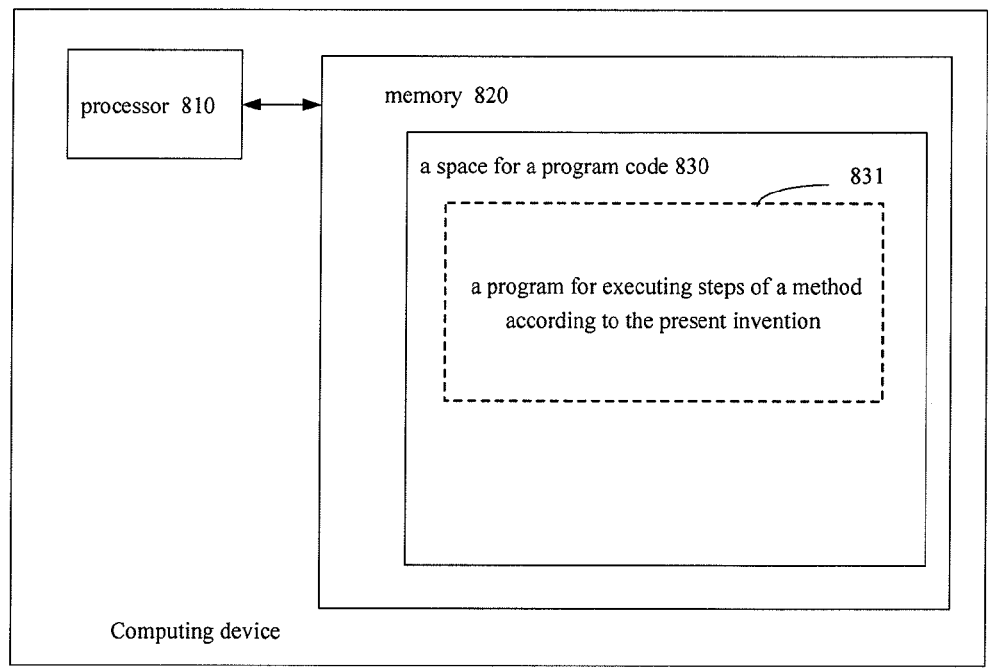
FIG. 8 illustrates a block diagram of a computing device for executing a method for prompting whether a portable locator has arrived on time according to the present invention.
Figure 9:
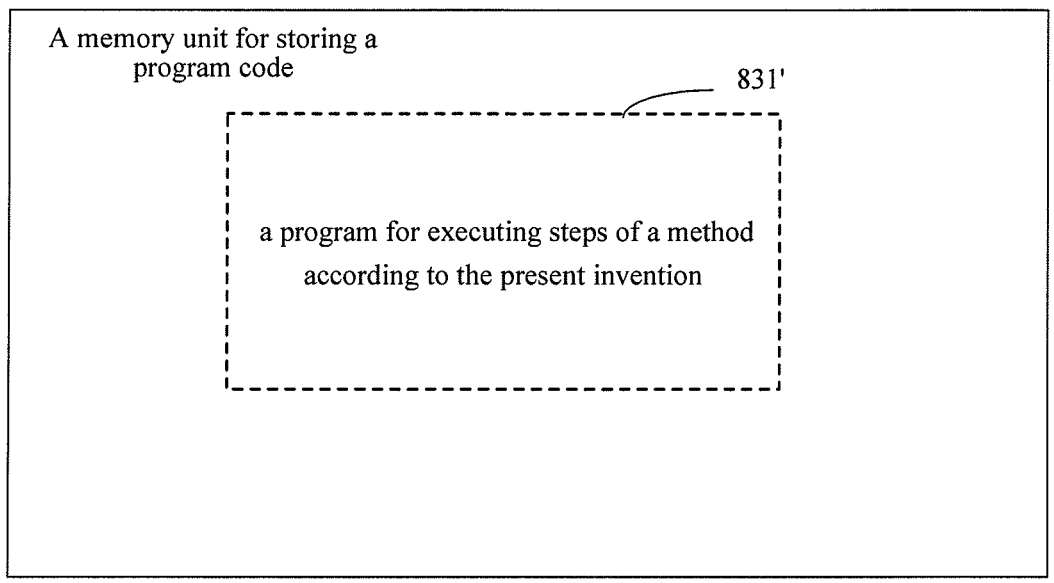
FIG. 9 illustrates a memory unit configured to maintain or carry a program code for implementing a method for prompting whether a portable locator has arrived on time according to the present invention.

For example, FIG. 8 illustrates a computing device for implementing the position information prompting method according to the present invention. The computing device conventionally comprises a processor 810 and a computer program product or computer-readable medium in the form of a memory 820. The memory 820 may be a flash memory, EEPROM (Electrically Erasable Programmable Read-Only Memory), EPROM, hard disk or ROM-like electronic memory. The memory 820 has a storage space 830 for a program code 831 for executing any step of the above method. For example, the storage space 830 for the program code may comprise program codes 831 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 9. The memory unit may have a storage section, a storage space or the like arranged in a similar way to the memory 820 in the server of FIG. 8. The program code may for example be compressed in a suitable form. Usually, the memory unit includes a computer-readable code 831', namely, a code readable by a processor such as 810. When these codes are run by the computing device, the computing device is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

The invention claimed is:

1. A method for prompting whether a portable locator has arrived on time, comprising:
    the portable locator obtaining position point information of a position point where the portable locator is, and transmitting the position point information to a server;
    the server recording the position point information and a positioning time corresponding to the position point information transmitted by the portable locator;
    generating a location area according to the position point corresponding to the position point information, judging whether a number of position points corresponding to other position information occurring again in the location area in a preset time period exceeds a threshold, and marking the location area as a stay area corresponding to the preset time period if the number of position points corresponding to other position information occurring again in the location area in a preset time period exceeds the threshold;
    judging, for multiple different preset time periods, whether a number of stay areas corresponding to respective preset time periods which are identical or partially overlapped exceeds a threshold, judging whether time of first reaching the stay areas corresponding to respective preset time periods which are identical or partially overlapped in the respective preset time periods complies with a rule if the number of stay areas corresponding to respective preset time periods which are identical or partially overlapped exceeds the threshold, and setting the stay area as a destination reminder area if the time of first reaching the stay areas corresponding to respective preset time periods which are identical or partially overlapped in the respective preset time periods complies with the rule;
    calculating an estimated arrival time of arrival at the destination reminder area according to the rule, or enabling a user to set an estimated arrival time of arrival at the destination reminder area;
    judging whether there is a position point indicative of arrival at the destination reminder area in a current preset time period, and generating and issuing a non-arrival reminder if there is not such position point and a current time has already exceeded the estimated arrival time.

2. The method according to claim 1, wherein after generating a location area according to the position point corresponding to the position point information, the method comprises:
    obtaining, in a preset time period, a positioning time corresponding to the position point appearing in the location area for the first time and a positioning time corresponding to the position point appearing in the location area for the last time, and calculating a time length between two positioning times;
    judging whether the time length between the two positioning times reaches a time threshold, marking the location area as a stay area corresponding to the preset time period if the time length reaches the time threshold; or calculating a proportion of the number of position points appearing in the location area during the time length to the number of position points corresponding to all position point information recorded during the time length, and marking the location area as the stay area corresponding to the preset time period if the proportion is higher than a preset value.

3. The method according to claim 1, wherein the rule means that a time of arrival at the destination reminder area for the first time in different preset time periods is all within a uniformly predetermined range or within a predetermined range which is adjusted periodically.

4. The method according to claim 1, wherein the method further comprises:
    determining the time of first arrival at the stay areas corresponding to respective preset time periods which are identical or partially overlapped in respective preset time periods, according to a positioning time corresponding to the position point which first appears at the stay areas in the respective preset time periods.

5. The method according to claim 3, wherein the judging whether time of first reaching the stay areas corresponding to respective preset time periods which are identical or partially overlapped in the respective preset time periods complies with a rule further comprises:
    if the time of first reaching the stay areas corresponding to respective preset time periods which are identical or partially overlapped in respective time periods is within the uniformly predetermined range or within a predetermined range which is adjusted periodically, judging the time of first reaching the stay areas corresponding to respective preset time periods which are identical or partially overlapped in the respective preset time periods as complying with the rule.

6. The method according to claim 5, wherein the calculating an estimated arrival time of arrival at the destination reminder area according to the rule further comprises:
    setting an average value of time of first arrival in respective time periods as the estimated arrival time; or adding up the average value of time of first arrival in respective time periods with the preset time period, and setting the sum as the estimated arrival time; or setting the latest on of time of first arrival in respective time periods as the estimated arrival time.

7. The method according to claim 1, wherein the judging whether the number of position points corresponding to other position information occurring again in the location area in a preset time period exceeds a threshold comprises:

making statistics for the number of position points corresponding to the position point information in the location area, the position point information is already-recorded position point information in the same preset time period as a preset time period including the positioning time of the position point information.

8. The method according to claim 1, wherein the generating a location area according to the position point corresponding to the position point information comprises:

according to the position point information, setting a natural geographical area where a position point corresponding to the position point information lies as the location area corresponding to the position point information; or setting a surrounding area which has a center and a preset radius as the location area corresponding to the position point information, the center being the position point corresponding to the position point information; or judging there are multiple neighboring position points for the position point corresponding to the position point information, and determining the location area corresponding to the position point information according to a distance between the position point and the multiple neighboring position points.

9. The method according to claim 1, wherein the method comprises:

the server receiving an activation request transmitted by a monitoring terminal, the activation request comprising an identifier of the portable locator;

activating the portable locator corresponding to the identifier according to the identifier of the portable locator included in the activation request, so that the activated portable locator transmits position point information to the server.

10. The method according to claim 9, wherein the method comprises:

the server transmitting to the portable locator a time interval of reporting the position point information or a reporting time so that the portable locator regularly transmits the position point information of the portable locator to the server according to the above time interval or reporting time; or the portable locator presetting a time interval of reporting the position point information or the reporting time, and regularly transmitting the position point information of the portable locator to the server according to the time interval or reporting time.

11. The method according to claim 1, wherein the user comprises a network account logged onto the designated server and already authorized to obtain information related to the portable locator, or a monitoring terminal registered in the designated server and bound with the portable locator.

12. The method according to claim 11, wherein after generating and issuing said non-arrival reminder, the method comprises:

the server transmitting said non-arrival reminder to the monitoring terminal; or using the network account to log on the server to obtain said non-arrival reminder.

13. The method according to claim 1, further comprising: displaying the destination reminder area in an electronic map to enable the user to set an estimated arrival time of arriving at the destination reminder area.

14. A method for prompting whether a portable locator has arrived on time, comprising:

the portable locator obtaining position point information of a position point where the portable locator is, and transmitting the position point information to a server;

the server recording the position point information and a positioning time corresponding to the position point information transmitted by the portable locator, and calculating and recording a route according to the positioning time and the position point information;

generating a location area according to the position point corresponding to the position point information, judging whether a number of position points corresponding to other position information occurring again in the location area in a preset time period exceeds a threshold, and marking the location area as a stay area if the number of position points corresponding to other position information occurring again in the location area in a preset time period exceeds the threshold;

according to an already-recorded route, determining times of travel from a stay area to another stay area, judging whether the times of travel from said stay area to said another stay area exceed a threshold, calculating a predicted travel time between said stay area and said another stay area or enabling a user to set the predicted travel time between said stay area and said another stay area, if the times of travel from said stay area to said another stay area exceed the threshold;

according to the already-recorded route and a trajectory rule and/or time rule, upon judging that a current position point of the portable locator already has left a stay area and judging a target area of the portable locator is another stay area, obtaining a positioning time corresponding to the position point of the portable locator appearing in the said stay area for the last time and a positioning time corresponding to the current position point of the portable locator, and calculating a time length between two positioning times;

judging whether the time length between the two positioning times exceeds the predicted travel time between the two stay areas, and generating and issuing a reminder indicative of failure to arrive at said another stay area within the predicted travel time if the time length exceeds the predicted travel time.

15. The method according to claim 14, wherein the calculating a predicted travel time between the two stay areas comprises:

according to the already-recorded route, determining times of travel from a stay area to another stay area, summating travel time from said one stay area to said another stay area each time and then dividing it by the times of travel to obtain the predicted travel time between the two stay areas.

16. The method according to claim 14, wherein the trajectory rule refers to a travel trajectory from one stay area to another stay area generated according to all position point information between the stay area and another stay area and the positioning time corresponding to respective position point information in different preset time periods according to the already-recorded route;

the time rule refers to, according to a positioning time corresponding to the position point of the portable locator appearing in the stay area for the last time in different preset time periods according to the already-recorded route, determining a departure time when the portable locator leaves said one stay area is all within a uniformly predetermined range or within a predetermined range which is adjusted periodically.

17. The method according to claim 16, wherein the step of, according to the already-recorded route and a trajectory rule, judging that the current position point of the portable locator already has left a stay area and judging a target area of the portable locator is another stay area comprises:

according to the already-recorded route, determining a travel trajectory from a stay area to another stay area, judging the current position point of the portable locator already has left the stay area and on the travel trajectory between the two stay areas, then judging that the target area of the portable locator is another stay area.

18. The method according to claim 16, wherein the step of, according to the already-recorded route and a time rule, judging that the current position point of the portable locator already has left a stay area and judging a target area of the portable locator is another stay area comprises:

according to the already-recorded route, within the current preset time period, judging a departure area of the portable positioning area is the stay area and judging a positioning time corresponding to a position point of the portable locator appearing in the stay area for the last time is within a uniformly predetermined range or within a predetermined range which is adjusted periodically, and judging that the target area of the portable locator is another stay area.

19. The method according to claim 14, wherein the judging whether the number of position points corresponding to other position information occurring again in the location area in a preset time period exceeds a threshold comprises:

making statistics for the number of position points corresponding to the position point information in the location area, the position point information is already-recorded position point information in the same preset time period as a preset time period including the positioning time of the position point information, and judging whether the number exceeds the threshold.

20. A non-transitory computer readable medium having instructions stored thereon that, when executed by a computing device, cause the computing device to perform operations for prompting whether a portable locator has arrived on time, the operations comprising:

receiving and recording position point information and a positioning time corresponding to the position point information transmitted by the portable locator;

generating a location area according to the position point corresponding to the position point information, judging whether a number of position points corresponding to other position information occurring again in the location area in a preset time period exceeds a threshold, and marking the location area as a stay area corresponding to the preset time period if the number of position points corresponding to other position information occurring again in the location area in a preset time period exceeds the threshold;

judging, for multiple different preset time periods, whether a number of stay areas corresponding to respective preset time periods which are identical or partially overlapped exceeds a threshold, judging whether time of first reaching the stay areas corresponding to respective preset time periods which are identical or partially overlapped in the respective preset time periods complies with a rule if the number of stay areas corresponding to respective preset time periods which are identical or partially overlapped exceeds the threshold, and setting the stay area as a destination reminder area if the time of first reaching the stay areas corresponding to respective preset time periods which are identical or partially overlapped in the respective preset time periods complies with the rule;

calculating an estimated arrival time of arrival at the destination reminder area according to the rule, or enabling a user to set an estimated arrival time of arrival at the destination reminder area; and judging whether there is a position point indicative of arrival at the destination reminder area in a current preset time period, and generating and issuing a non-arrival reminder if there is not such position point and a current time has already exceeded the estimated arrival time.

* * * * *